United States Patent [19]
Ojima

[11] Patent Number: 5,392,884
[45] Date of Patent: Feb. 28, 1995

[54] SLOW-ACTING ROTARY DEVICE

[75] Inventor: Juji Ojima, Aikawa, Japan

[73] Assignee: NHK Spring Co., Ltd., Yokohama, Japan

[21] Appl. No.: 111,839

[22] Filed: Aug. 25, 1993

[30] Foreign Application Priority Data

Aug. 26, 1992 [JP] Japan .................................. 4-250679
Nov. 13, 1992 [JP] Japan .................................. 4-327639

[51] Int. Cl.⁶ .............................................. F16F 9/12
[52] U.S. Cl. ........................................ 188/293; 188/290
[58] Field of Search ............... 16/58; 188/290, 297, 188/306, 307, 309, 310, 322.5

[56] References Cited

U.S. PATENT DOCUMENTS

| | | | |
|---|---|---|---|
| 1,617,366 | 2/1927 | Beard et al. | 188/290 |
| 4,576,252 | 3/1986 | Omata | 188/290 |
| 4,666,386 | 5/1987 | Winkler et al. | 188/307 |
| 4,691,811 | 9/1987 | Arakawa et al. | 188/290 |
| 5,269,397 | 12/1993 | Kawamoto et al. | 188/290 |

FOREIGN PATENT DOCUMENTS 0113926  5/1987  Japan .................................. 188/290

Primary Examiner—Robert J. Oberleitner
Assistant Examiner—Chris Schwartz
Attorney, Agent, or Firm—Lackenbach Siegel Marzullo & Aronson

[57] ABSTRACT

The device comprises a shielded outer cylinder (2), a shaft member (3) installed pivotally within, the cylinder (2), fins (4, 5) either of which are connected with the cylinder (2) or the shaft member (3) by means of base ends (4a, 5a) with edge ends (4b, 5b) thereof being slide contacted onto the other, and a fluid material (6) filled within the outer cylinder (2), wherein the outer cylinder (2) or the shaft member (3) is connected with a stationary member or a rotary member.

6 Claims, 5 Drawing Sheets

F I G. 3
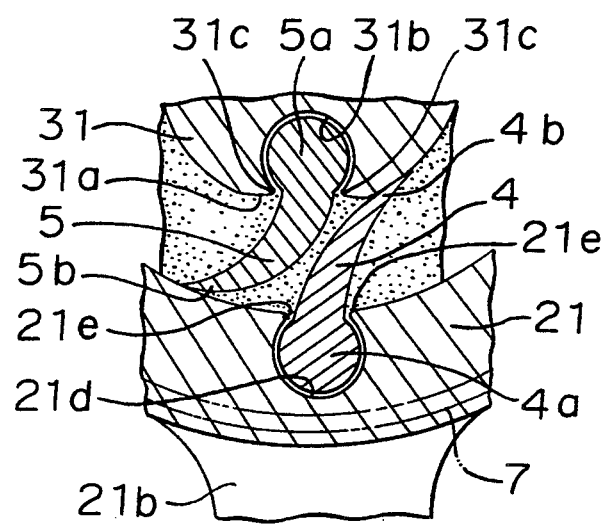

SLOW-ACTING ROTARY DEVICE

BACKGROUND OF THE INVENTION

The present invention relates to a slow-acting device to control velocity of a rotary member pivotally supported by a stationary member.

In general, viscous grease has been placed between a rotary shaft connected integrally to a rotary member and a bearing therefor. In this case, shearing resistance of the grease functions as a brake to stifle abrupt rotation.

However, it has been very difficult to achieve an appropriate and uniform clearance between the rotary shaft and the bearing, resulting in failure when applying a great rotary moment, although greater shearing resistance has well been known to accrue from a smaller clearance between shaft and bearing.

The purpose of the present invention is to provide high torque resistance sufficient to provide high rotary energy without the need to be concerned with difficult clearance control.

SUMMARY OF THE INVENTION

In order to achieve said purpose, the present invention comprises:

a shielded outer cylinder, a shaft member which is pivotally supported within the cylinder, at least one fin which is connected with the cylinder or the shaft so as to connect the base end thereof with either the cylinder or the shaft member, to slide contact the edge end thereof onto the other of the cylinder or shaft member, and a fluid material filled within the cylinder, wherein the cylinder or shaft is connected with a stationary member or a rotary member, respectively.

A swell portion formed at the base end of the fin can be inserted movably into a concave formed in either the cylinder or the shaft for connection therewith. The fin may be made of elastic or rigid material, the base end of which is connected integrally with the cylinder or the shaft.

Further, when being connected movably with either the cylinder or the shaft, the swell portion of the fin may be spring biased so as to make the edge end slide contact onto the other.

Either gel, water, oil, grease or air may be used as one of the fluid materials mentioned above. The fin may be provided with a thin hole or a groove to pass fluid therethrough.

Because of the structure of the present invention, when the rotary member is rotated relative to the cylinder, the fluid material, between fins connected with the cylinder and shaft member, is compressed, resulting in high resistant torque against rotation energy of the rotary member.

Also, in case the base end of the fin is connected movably, or the fin is made of elastic material, high resistant torque is produced under positive rotation due to slide contact of the edge end with the cylinder or shaft, but, on the contrary, under adverse rotation, only a low resistant torque is produced due to clearing of the edge end from the cylinder or shaft.

Further, in the case of a fin installed with spring biasing or an elastic fin, when changing rotation direction as above, a rapid response can be obtained due to instant return of the edge end to the slide contact.

BRIEF DESCRIPTION OF THE DRAWINGS

The object and features of the present invention will become more readily apparent from the following detailed description taken in conjunction with the accompanying drawings in which:

FIG. 3 is an enlarged cross section of the main portion in FIG. 2.

DETAILED DESCRIPTION OF THE INVENTION

Figure 1:
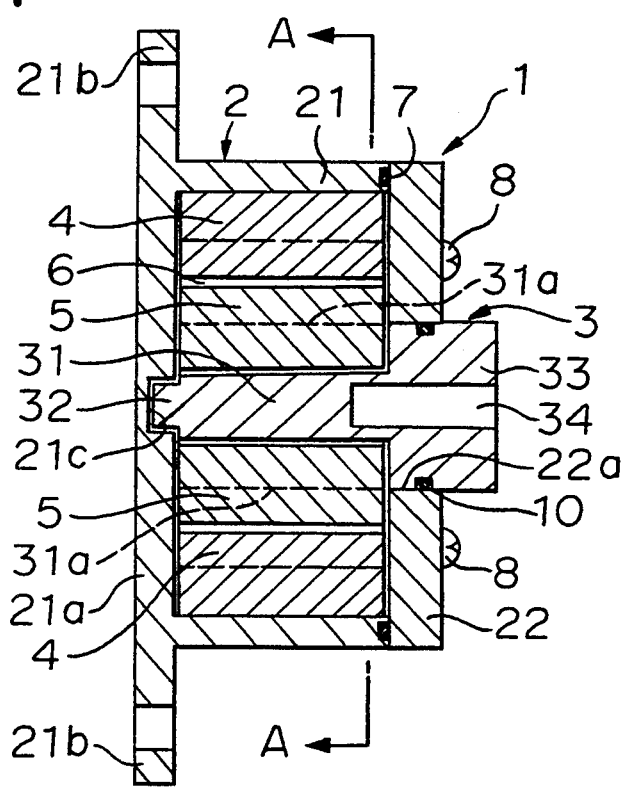
FIG. 1 is a cross section along line B—B in FIG. 2 showing the present invention.
Figure 2:
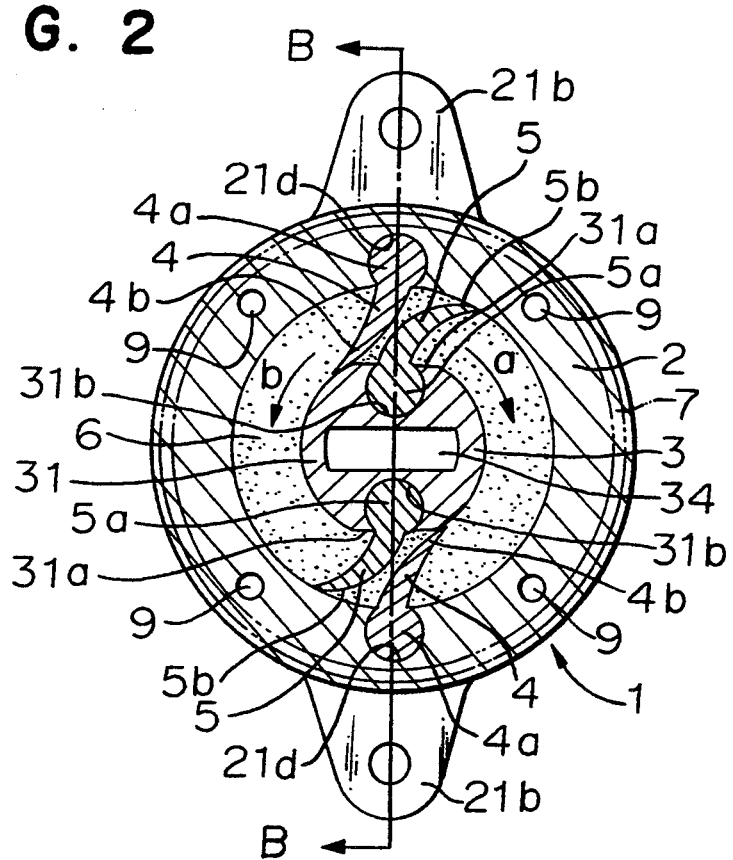
FIG. 2 is a cross section along line A—A in FIG. 1.

The preferred embodiments according to the present invention are described in detail with reference to the accompanying drawings as follows:

The first embodiment of a slow-acting rotary device (1) is shown in FIGS. 1—3.

The device (1) comprises a shielded outer cylinder (2), a shaft member (3) installed pivotally within the cylinder, fins (4 & 4) connected to the cylinder, fins (5 & 5) connected to the shaft, and fluid material filled within the cylinder, i.e., viscous grease (6), wherein the cylinder (2) and the shaft (3) are secured to a stationary member and rotary member, respectively.

The cylinder (2) comprises a cylinder body (21) with a bottom plate 21a and a lid (22) to shield the opening of the body (21), the lid being closely attached to the body (21) by means of screws (8) through an O-ring (7) mounted into a circular groove made at the opening end of the cylinder body (21).

Approximately at the center of the bottom plate (21a) of the cylinder body (21) a round recess (21c) is formed to receive the end of the shaft (3), and two attaching portions (21b) for the stationary member (not shown) are extendingly and symmetrically formed on the circumference of the bottom plate (21a), as well as at the center of the lid (22), and a round bearing portion (22a) is bored for receiving the rear end of the shaft (3).

In addition, two recesses (21d) are symmetrically formed in the depth direction of the cylinder body (21) on the interior wall thereof, the recesses being opened inward with a C-shaped cross section.

In FIG. 2, numeral 9 is a screw opening formed on the opening of the cylinder body (21).

The shaft (3) comprises a solid body with a large diameter portion (31) having parallel cut surfaces (31a), and a small diametered projection (32) and a shaft portion (33) integrally at both sides thereof, wherein the C-shaped recesses (31b) opening outward are formed on the parallel cut surfaces (31a) in an axial direction.

A connection recess or groove (34), having a rectangular cross-section, is provided in the end surface of the shaft portion (33), and the shaft (3) is connected with a rotary member (not shown), without sliding or rotating by means of the recess (34).

Thus, the small-diametered projection (32), the large diameter portion (31) and the shaft portion (33) are inserted and positioned in the round concave (21c) of the cylinder body (21), cylinder body (21) and the round bearing portion (22a), respectively, resulting in pivotal installation. In such an arrangement, a border line of the shaft portion (33) to the large diameter portion (31) functions as a stopper against slip-off of the shaft (3), and an O-ring (10), provided in a groove on the shaft body (33) shields between the body (33) and the lid (22).

Fins (4, 5) comprise a rigid plate body which curves in width direction, having the same length as the large diameter portion (31) of the shaft (3), i.e., same as the depth of the cylinder body (21), in a direction rectangular to the width direction. Along the base end of the plate body, swell portions (4a, 5a) are formed like a cylinder, and become thinner toward ends (4b, 5b), respectively.

Swell portions (4a, 5a) are then inserted into the concaves (21d, 31b) of the cylinder body (21) and shaft (3), respectively, and the opposite ends (4b, 5b) are slide contacted to the circumference of the shaft (3) and the internal surface of the cylinder body (21), respectively.

In the installation of the fins, the concave sides of the fins (4, 5) must be at the direction "b" rotation and at the direction a rotation of the shaft (3), respectively.

As shown in FIG. 3, the opening rims (21e, 31c) of the recesses (21d, 31b) are bevelled so as to make the fins (4, 5) move vibratingly.

The grease (6) is filled in the cylinder body (21) before assembly thereof and shielded into the outer cylinder (2) by installation of the lid (22) thereon. Quantity of the grease (6) must be such as to fill the vacant space after the fins (4, 5) have been assembled.

The slow-acting rotary device (1) then functions as follows:

The device (1) is secured to a stationary member (not shown), by means of the attaching portion (21b), and connected with a rotary member (not shown) through the connection concave (34).

When the shaft (3) rotates toward direction "a" (clockwise), the edge end (5b) of the fin (5) slide contacts onto the inner wall of the cylinder body (21) due to the viscosity resistance of the grease (6), and at the same time the edge end (4b) of the fin (4) is pressed onto the circumference of the large diameter portion (31) of the shaft (3). A high-resistant torque is produced against the direction of rotation of the shaft (3) because of the compressed grease (6) between fin (4) and fin (5). Then, the grease (6) flows slowly through various clearances between the swell portions (4a, 5a) and the recesses (21d and 31b), and between the fins (4, 5) and the bottom plate (21a) as well as the lid (22), resulting in slow-acting rotation of the rotary member toward direction a.

Contrarily, when the shaft (3) rotates toward direction "b" (counterclockwise), the edge end (5b) of fin (5) separates from the inner surface of the cylinder body (21) under resistance of the grease (6). Accordingly, the rotary member can rotate by means of a light load without resistance of the grease (6).

As described above, said device (1) functions as a slow-acting rotary device only when rotated in one direction, i.e., direction a.

Figure 4:
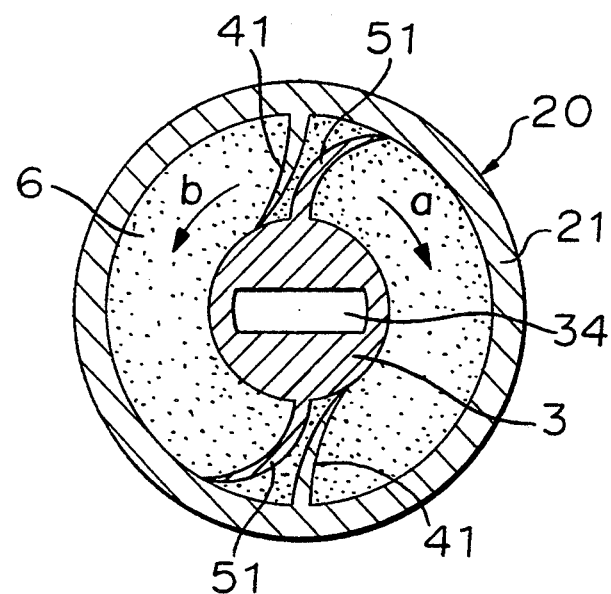
FIG. 4 is a cross section of an embodiment of the present invention.
Figure 5:
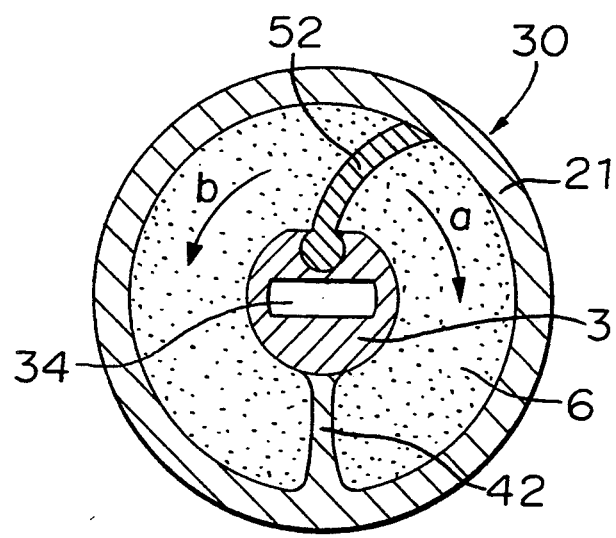
FIG. 5 is a cross section of another embodiment of the present invention.

FIGS. 4 and 5 show other one-direction type embodiments.

Slow-acting rotary devices (20, 30) in FIGS. 4 and 5 comprise the same structures as said device (1) except as to the fins. Common members are therefore referred to by the same numerals, omitting duplicate descriptions. Namely, as to device (2) fins (41, 51) are formed integrally with cylinder body (21) and shaft (3), respectively. Such fins have elasticity, and when the shaft (3) rotates toward direction a, the fins (41, 51) compress grease (6) to generate high resistance torque, but when rotated in direction b, the fin (51) separates from the inner surface of the cylinder body (21), reducing the torque.

In the device (30) of FIG. 5 a fin (52) attached to a shaft (3) is similar to the fin (5) of the device (1) in form and attachment, but a fin (42) is attached integrally to a cylinder body (21) made of rigid material. As there is only one of each fin, a wide rotation range is obtained in the device (30). Resistance torque vs. rotation direction of the shaft (3) is the same as in the device (20).

Figure 6:
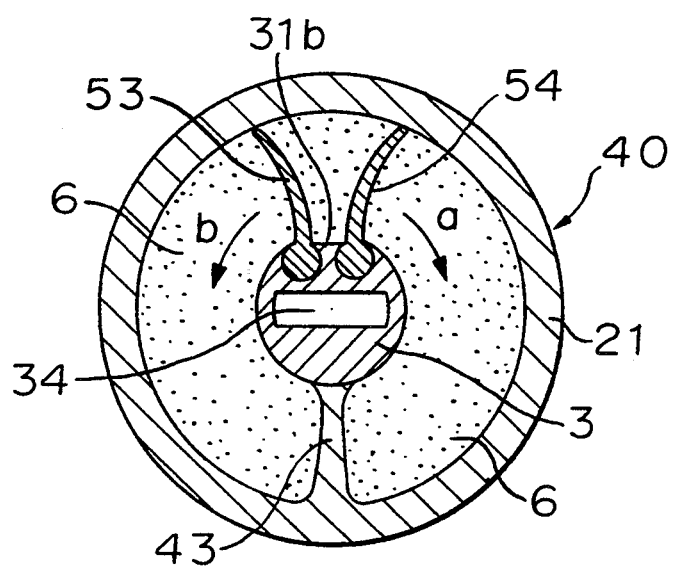
FIG. 6 is a cross section of still another embodiment of the present invention.
Figure 7:
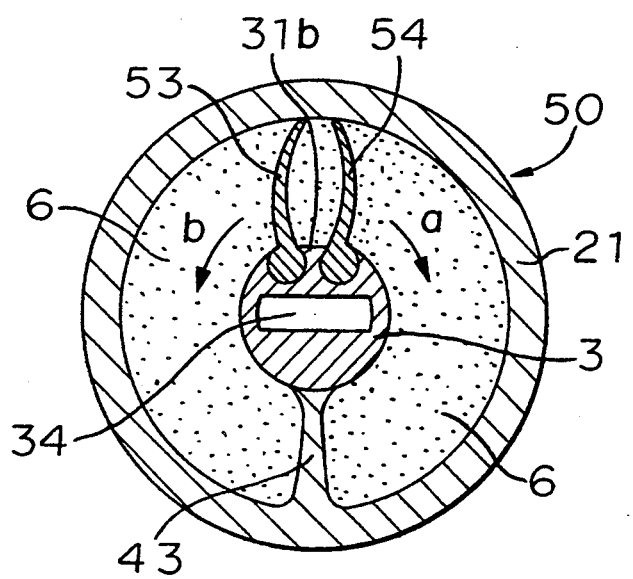
FIG. 7 is a cross section of a further embodiment of the present invention.

In FIGS. 6 and 7, two-direction type devices (40, 50) are shown as the 4th and 5th embodiments. Since the structures and components in devices (40, 50) are the same as in device (1), the same components bear the same numerals, omitting duplication of descriptions.

Namely, in said devices (40, 50), two fins (53, 54) are installed to shaft (3) facing away from each other, and a fin (43) made of rigid material is integrally secured to the cylinder body (21).

The fins (53, 54) are formed and installed similar to the fin (5) of the device (1), and in device (40), the fins are installed in recesses (31b) of the shaft (3), with depressed sides facing together, and contrarily, in device (50), with raised sides facing together.

When rotating the shaft (3) in direction a, fins (54, 43) compress grease (6) in the device (40), and fins (53, 43) compress grease (6) in the device (50), leading to production of high torque, respectively. Even when also rotating in direction b, fins (53, 43) in device (40), and fins (54, 43) in device (50) attain high torques by compressing grease (6). Thus, devices (40, 50) are two-direction type slow-acting rotary devices effective for both rotation directions.

Figure 8:
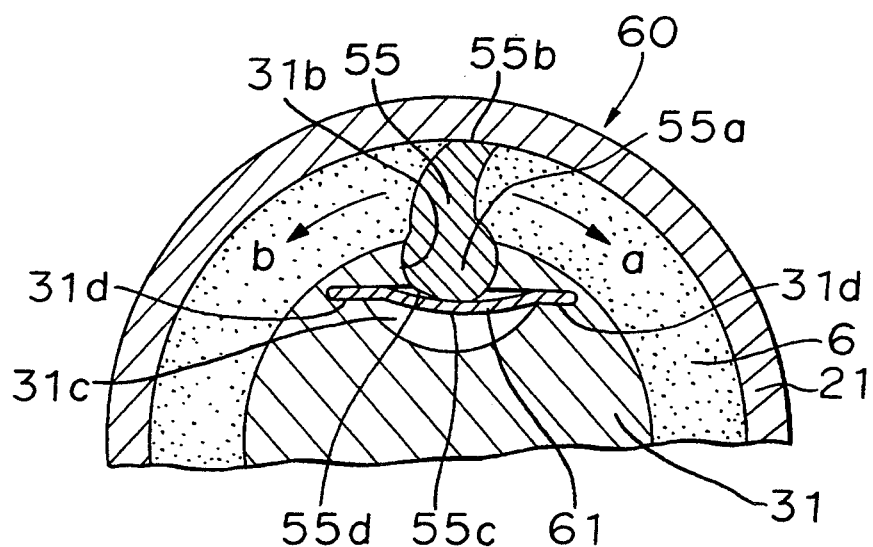
FIG. 8 is a cross section of a still further embodiment of the present invention.
Figure 9:
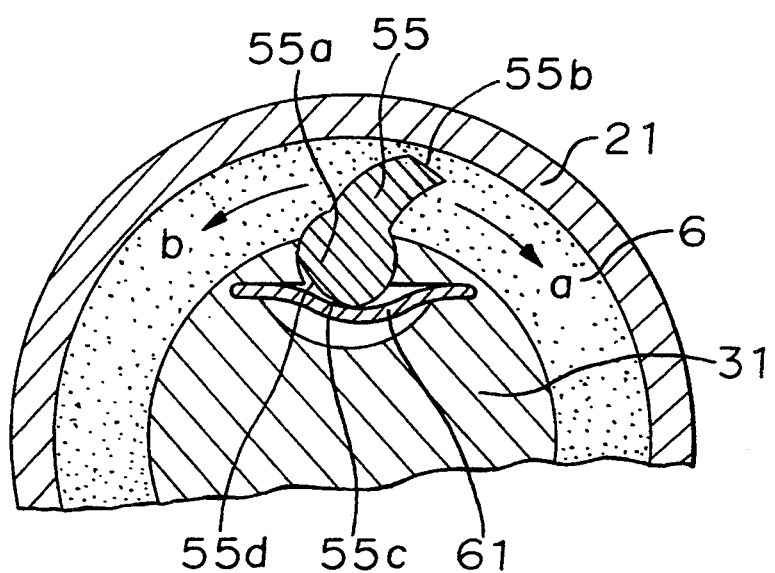
FIG. 9 is a cross section explaining functions of the present invention.

A slow-acting rotary device (60) is shown in FIGS. 8 and 9 as the 6th embodiment.

In device (60), a fin (55) is installed with means of spring biasing resulting in effectiveness for both one-direction and two-direction types.

Namely, the fin (55), with the swell portion (55a) thereof being movably connected with a large diameter portion (31) of a shaft (3) by inserting the swell (55a) into a recess (31b), is installed so as to make the edge end (55b) thereof slide contact to the interior of a cylinder body (21) by means of spring biasing.

In this case, the concave (31b) is connected with a semi-circular swell (31c), and two slits (31d) opening to the swell (31c) are provided at both sides thereof.

At the same time, the swell (55a) has a flat (55c) and a relief (55d) wherein the center of the spring (61) abutting the flat (55c) urges the edge end (55b) of the fin (55) onto the interior of the cylinder body (21), whereas the relief (55d) maintains such urging in good state (see FIG. 8).

When rotating the large diametered portion (31) of the shaft (3) in direction a, the urging force of the spring (61) is consistent with the compressing direction of grease (6), resulting in high resistance torque owing to the slide contact of the edge end (55b) in a good state. Contrarily, when rotating the large-diametered portion (31) toward direction b, the resistance of grease (6) overcomes the urging force of the spring (61), rotating the fin (55) toward the reverse direction which releases the edge end (55b) from the interior of the cylinder body (21) to allow the grease (6) to move freely (see FIG. 9). Consequently, the large-diametered portion (31) can rotate in direction b even with low torque.

Besides, in the device (60), good slide contact of the edge end (55b) can be obtained instantly even alternating rotation directions owing to the biasing force of the spring.

For such devices, a wire spring or the like may be utilized in place of the plate spring, as desired in respective designs.

As mentioned above, these devices 1, 20, 30, 40 50 and 60 can, owing to compressed grease, provide resistance torque exceptionally higher than any conventional devices with uncompressed grease, leading to applications for such rotary members requiring higher rotary moment even with compact sized devices.

Further, the present invention consists of a small number of components and structure members, such as outer cylinder, shaft, fins and fluid material only, enabling easy assembly and the design of either one-direction or two-direction types.

Apart from the above, as respects device (30), in FIG. 5 a stationary fin (42) and a movable fin (52) may be mounted to the shaft (3) and the cylinder body (21), respectively. Further, an orifice to pass fluid material therethrough can be provided in the fins.

What is claimed is:

1. Rotary device comprising:
    a sealed outer cylindrical member,
    a shaft member pivotally mounted for rotation within said cylindrical member and forming an annular space therewith, at least one fin connected to each of said cylindrical member and to said shaft member, each fin being connected at a base end thereof with one of said members and bridging said annular space and having an edge end in direct contact with the other of said members, and fluid material filled within said outer annular space member.

2. A slow-acting rotary device as set forth in claim 1, wherein,
    said at least one fin is connected with said members in such a manner that a swell portion formed at said base ends of said fins are inserted vibratingly into a recess formed in said members.

3. A slow-acting rotary device as set forth in claim 1, wherein,
    at least one of said fins are made of elastic or rigid material which is connected integrally with at least one of said members.

4. A slow-acting rotary device as set forth in claim 1, wherein,
    at least one base end of said fins is connected with at least one of said members, and is spring biased so as to urge the edge end thereof into sliding contact with the other of said members.

5. A slow-acting rotary device as set forth in claim 1, wherein,
    said fluid, material is selected from the group consisting of water, oil, grease, gel or air.

6. A slow-acting rotary device as set forth in claim 1, wherein,
    an orifice or thin groove is provided in said fins around the base of order that said fluid material may pass therearound.

* * * * *